United States Patent [19]
Scoville et al.

[11] 3,855,754
[45] Dec. 24, 1974

[54] MITER JOINT LOCK AND COMBINATION

[76] Inventors: Wright A. Scoville, 20 S. Barneburg Rd., Medford, Oreg. 97501;
Chauncey J. Scoville, 7305 N.E. 39th St., Portland, Oreg. 97211

[22] Filed: Feb. 5, 1973

[21] Appl. No.: 329,358

[52] U.S. Cl............... 52/755, 52/753 C, 52/753 D, 52/584, 403/401
[51] Int. Cl............................................. E04b 1/40
[58] Field of Search.. 52/656, 758 H, 753 D, 753 C, 52/753 G, 127, 586, 584, 582, 755, 754, 756; 403/401, 402, 231

[56] References Cited
UNITED STATES PATENTS

| | | | |
|---|---|---|---|
| 2,140,772 | 12/1938 | Slayter | 52/753 G |
| 2,540,468 | 2/1951 | Anderson | 52/753 C |
| 3,064,321 | 11/1962 | Rose | 52/584 |
| 3,245,124 | 4/1966 | Faske | 52/753 D |

FOREIGN PATENTS OR APPLICATIONS

| | | | |
|---|---|---|---|
| 412,586 | 6/1946 | Italy | 52/755 |
| 599,620 | 11/1959 | Italy | 52/755 |

*Primary Examiner*—John E. Murtagh
*Attorney, Agent, or Firm*—Townsend and Townsend

[57] ABSTRACT

A miter lock substantially concealed within the members of a wooden miter joint including a link wholly concealed within said members at the joint and extending across the butting surfaces of the joint at a right angle thereto.

An anchor element anchors one end portion of the link in one of said members and a cam pin rotatably supported within the other member of the pair extends through the other end portion of said link in a camming relation thereto for effecting movement of the member anchored to one end of the link toward the other member thereby effecting a tight joint and locking the members together.

Only one end of the anchoring element and the cam pin are visible at one of the sides of the joint members, which would be the rear side of the members of a picture frame or either side of other frame members, and which ends may be concealed.

7 Claims, 11 Drawing Figures

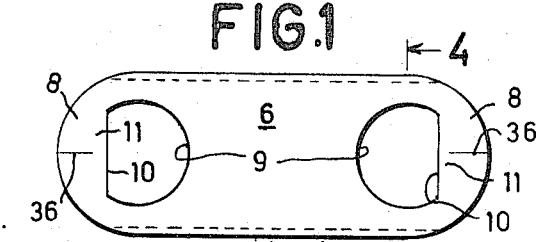
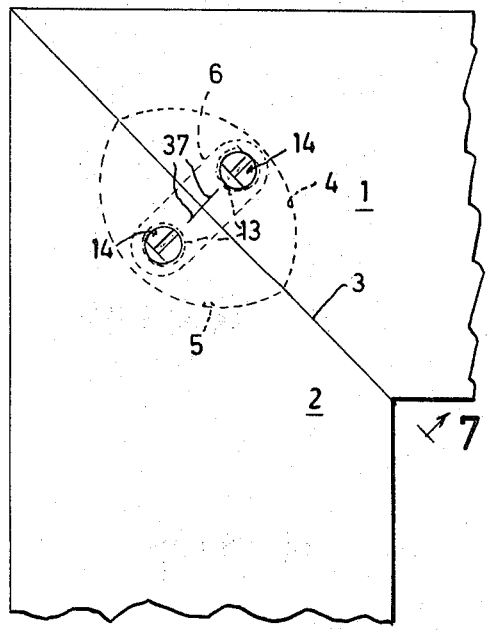
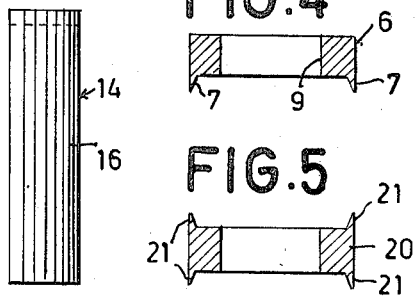
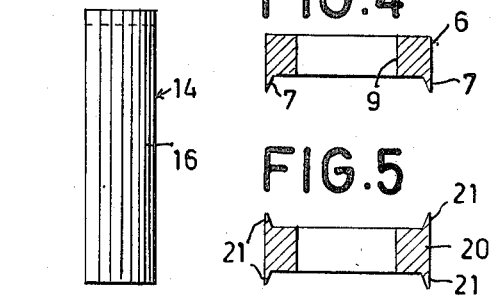
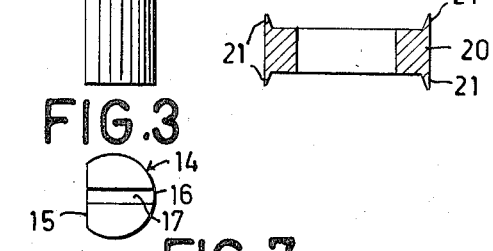
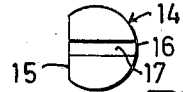
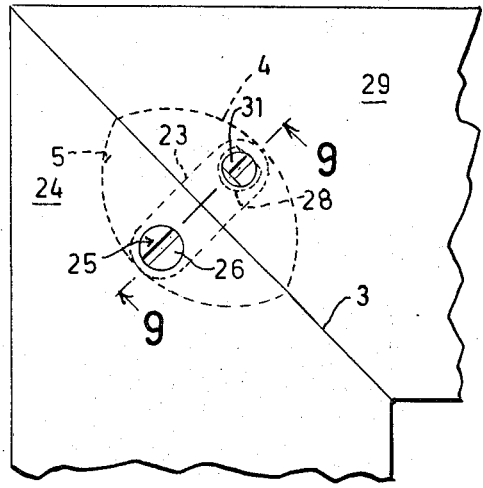
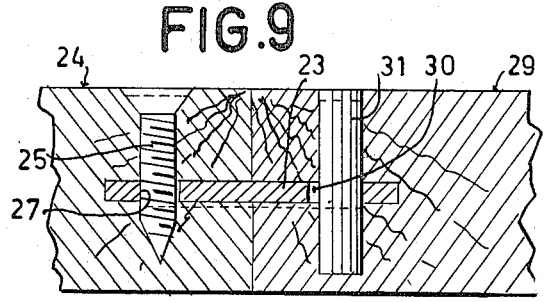
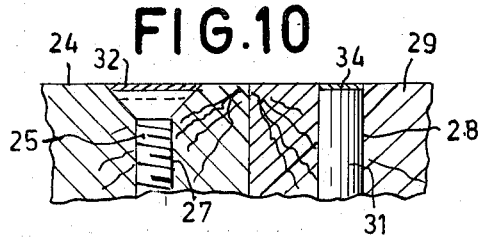
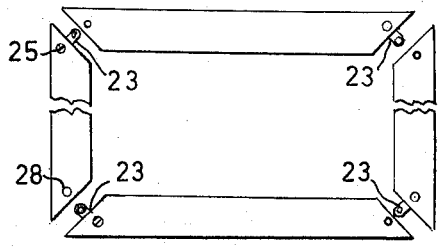

MITER JOINT LOCK AND COMBINATION

SUMMARY

In the commercial manufacture of picture frames, door frames and window frame casings, and the like, in which one or both ends of the frame members are cut to provide accurate miter joints, there remains the problem of securing the members together at the joints. Glue alone is insufficient, and the use of nails, screws and dowels extending across the joint does not lock the members together at the corners, nor provide a clamping force, and frequently results in mutilation of the corners. The same objection applies to angle pieces for connecting the frame members at the corners.

Efforts in attempts to apply a clamping force involve angularly extending elements or connectors, extending across the joint, to be driven into the adjacent ends of frame members at the miter joints. These frequently result in mutilating the frame members, are unsightly, and their clamping effect is limited and weak, and there is no positive locking of the joint.

One of the main objects of the present invention is the provision of a simple, readily made, economical means adapted to be carried by the wooden members of a mitered joint, which means, when so carried, includes actuating means actuatable for clamping said members together along the butting surfaces of the joint, and for securely locking said members together at the joint, and which means is also substantially fully concealed within the members of the joint when their mitered surfaces are clamped together.

Another object of the invention is the provision of a clamping and locking means for clamping and locking the members of a mitered wooden joint together along mitered, butting surfaces and which members are formed adjacent their said mitered surfaces for substantially fully enclosing said means when in locking position.

A still further object of the invention is the provision of a single but stronger clamping and locking means for securing the mitered surfaces of the members of a mitered joint together, than heretofore, and which means when applied and actuated for so clamping and locking said members together does not mutilate the members and is releasable without mutilating said members, and is substantially fully enclosed within said members.

An additional object is the provision of wooden frame members for a picture frame and the like, each of which is angularly cut at its ends to form a miter joint at each corner of the frame when assembled to form the latter, and which frame members also are provided with means for clamping and for locking the miter joints together.

Other objects and advantages will appear in the drawings and description.

DESCRIPTION OF DRAWINGS

FIG. 1 is an enlarged, elevational view of a link employed to connect a miter joint.

FIG. 2 is an enlarged, side-elevational view of a cam pin adapted to extend through the opening at each end of the link.

FIG. 3 is a top plan view of the pin of FIG. 2.

FIG. 4 is a cross-sectional view along line 4—4 of FIG. 1.

FIG. 5 is a cross-sectional view similar to that of FIG. 4 showing a modification of the structure of the link.

FIG. 6 is a fragmentary, side-elevational view of a miter joint showing the link of FIG. 1, and the pin of FIG. 2 in a clamping and locking position within said joint.

FIG. 7 is a cross-sectional view taken along line 7—7 of FIG. 6.

FIG. 8 is a top plan view of a modification of the structure shown in FIG. 6.

FIG. 9 is an enlarged, cross-sectional view taken along line 9—9 of FIG. 8.

FIG. 10 is a fragmentary, enlarged, cross-sectional view similar to that of FIG. 9 but showing the clamping means fully concealed within the joint.

FIG. 11 is a greatly reduced, side-elevational view of members of a picture frame at its rear side in which each member may be provided with a link such as shown in FIGS. 8, 9 ready for assembly and for insertion of a pin such as shown in FIG. 2 for clamping and locking the members together when the members are assembled.

DETAILED DESCRIPTION

The members 1, 2 (FIG. 1) are each cut to an angle to provide the butting surfaces of the miter joint along a plane 3.

A kerf 4 (FIGS. 6, 7) is cut into member 1 from its mitered surface for a predetermined distance, and a corresponding kerf 5 is cut in member 2 from its mitered surface or plane 3 for the same distance. Said kerfs may be readily cut to said distance by a circular saw, and they are preferably spaced approximately equally from the ends of the mitered surfaces, providing flat sided recesses that open outwardly of said surfaces. When the members 1, 2 are positioned with their mitered surfaces together for forming the joint, the flat sided recesses, which are designated 4, 5 will be coplanar in a plane at a right angle to the plane 3, and their open ends will be in registration. The maximum depth of each recess will be centrally between the ends of its open side, the closed ends of the recesses are circular and terminate at the miter joint.

The main body of the miter locking device is a link 6 (FIGS. 1, 4) comprising an elongated strip of rigid material, such as metal, formed along its opposite longitudinally extending edges with sharp, narrow edges 7 along each of said edges projecting to one side of the strip (FIG. 4). The opposite end portions 8 of the link 6 are rounded hence the ridges 7 terminate short of the opposite, curved terminal ends of the strip. These ridges, as will later, appear, not only provide guide means for guiding the link into the members forming the joint, but also constitute reinforcing means for retaining the strip rigid against bending.

An opening 9 is formed in each end portion of the link. Said openings may be of the same size, and each is circular except for a portion 11 of the link along the edge nearest the adjacent edge, which is formed along a chord line to provide a flat edge 10 facing toward the center of the link, or in a direction toward each other, said edge providing a cam engaging surface, as will appear later.

The members 1, 2 are each formed with a cylindrically sided hole 13 equally spaced from the plane 3, or mitered end surface of each of the members 1, 2 when the surfaces are together and the recesses 4, 5 are in registration with each other and said holes extend across the kerfs or recesses 4, 5 at right angles to the plane in which said recesses are disposed. The holes 13 do not extend completely through the members 1, 2 of the miter joint, and open outwardly of said members at the same side of said members, which would be the rear side in a picture frame, or the side not exposed to view from a person inside a room in the case of window casings.

The thickness of the link or strip 6 is preferably substantially the same as the transverse dimension of each recess 4, 5. A link having the thickness of one-sixteenth inch, a width of three-eighths inch and a length of five-eighths inch has been found to be satisfactory for a miter joint of members, each being approximately 2¼ inches in width and approximately eleven-sixteenths inch in thickness. The ridge 7 along each of the two opposite edges of the strip may project about one-thirty-second inch from a flat side of a strip, with the oppositely outwardly facing surfaces of the coplanar with the longitudinally extending side edges of the strip, which edges are flat and perpendicular to the flat sides of the strip. The oppositely facing surfaces of the projecting ridges extend slantingly outwardly to form the sharpened edges of the ridges, and the base of each ridge is narrow (FIG. 4).

Grooves 7', each corresponding in cross-sectional outline to the cross-sectional contour of each ridge 7, are swaged into one side of each recess 4 (FIG. 7). These grooves are spaced apart the same distance as the ridges 7 and extend to the closed ends of the recesses and extend perpendicular to the mitered end surface of each member. Said grooves function to accurately guide the ends of the strip 6 to the positions shown in FIG. 6.

In assembling the miter joint, one end portion 8 of the strip is inserted into the open side of one of the recesses (such as recess 4 in member 2) centrally between the ends of the recess and in a position extending at a right angle to plane 3 and is pushed into said recess, with the ridges 7 in grooves 7', until the opening 9 in the leading end of the strip is in registration with the hole 13. The maximum depth of each recess is slightly greater than half the length of the link, hence substantially half of the link 6 will project from member 2 after the link is in member 2, as described.

The projecting half of the link 6 is then pushed lengthwise into the recess 5 centrally between the ends of the open side of said recess until the opening 9 is in register with the hole in member 1, at which time the mitered end surfaces of the members 1, 2 will be substantially together.

Cam pins, generally designated 14 (FIGS. 2, 3) are then inserted into holes 13 (FIG. 6) and through the openings 9 in the ends of the link 6.

Each cam pin is cylindrical, except for a flattened side 15 (FIG. 3). The cylindrical side 16 of each pin 14 fits the cylindrical sides of holes 13. The holes 13 are positioned so that the axis about which the cylindrical side 16 of each pin is developed will be coaxial with the axis about which the circular portion of each hole 13 is formed when each opening 9 is in register with one of the holes 13. The radius of the cylindrical sides 16 of each pin is less than the radius of the circular portion of the edge of each opening 9, and in order to insert the pins into the openings 9 the flat side 15 of each pin faces the flat side 10 of each opening.

The length of each pin is preferably no greater than the depth of each hole 13, hence the pins will not protrude from the holes when in positions extending through openings 9 to the bottoms of the holes 13. The outer end of each pin is formed with a slot 17 for a screw driver and upon rotating either pin, or both, through 90° the cylindrical surface 16 will have a camming engagement with the flat surface 10 of the link to clamp the miter faces of the members 1, 2 tightly together and to lock them together.

Glue may be applied to the miter faces prior to their engagement to effect a permanent miter joint, although the links and pins will hold the miters together.

FIG. 5 shows a link 20 which is a modification of link 6, in that it shows ridges 21 projecting from both longitudinally extending edges of the link, and opposite sides of each recess are formed with grooves corresponding to grooves 7'.

FIGS. 8, 9 show a modification of the structure shown in FIGS. 1–7 in that the link, designated 23 is anchored at one end in one of the members 24 by a screw 25, the head 26 of the screw being countersunk so its axially outer surface is flush with the surface of member 24. The link itself is formed with a circular opening 27 through which the screw extends.

The end of the link opposite opening 27 is formed with an opening 28 that corresponds to either of the openings 9 in link 6, and the other member 29 is formed with a hole 30 that corresponds to hole 13 in member 1. A cam pin 31 corresponding to cam pin 14 extends into hole 30 and through opening 28.

If desired, the member 24 (FIG. 10) may be countersunk to position the head of screw 25 slightly below the surface of member and then covered with a filler, such as plastic wood 32 or the like to fully conceal the screw head, and hole 33, which corresponds to hole 13 may be slightly deeper to provide a space above the upper end of the cam pin 16 to be filled with a filler 34 such as plastic wood, to fully conceal the pin.

The pin 16 in the form shown in FIGS. 8–11 is rotated to clamp the members at the miter joint tightly together and to positively lock them together.

FIG. 11 shows a picture frame in which each frame member has a link 23 secured in one of its ends, with the opposite end of the link projecting therefrom for insertion into the adjacent end of the adjacent frame member. The end of each frame member opposite the one carrying the link is adapted to receive the projecting end of the adjacent frame member.

In order to assemble the picture frame it is only necessary to insert the projecting ends of the links into the recesses in the ends adjacent the projecting links and to then insert the cam pin and rotate the latter to tighten the joint and to positively lock the joint against separation.

Obviously frame members of different lengths may be quickly assembled to form frames of different dimensions, with each frame member having a link 23 secured in position in one of the ends.

If desired, the links or strips 13, 23 may each be formed with a guide line 36 for alignment with a similar guide line 37 on members 1, 2 or on one or both ends of members 24 to quickly align the links 13, 23 for insertion into the members. The fact that ridges 7 (FIG. 4) and 21 (FIG. 5) terminate equal distances from the terminal end portions of the links, provide means to facilitate the positioning of the links at a right angle to the miter surfaces. Upon inserting the end portions 8 of the links into the recesses, when both adjacent ends of the ridges will enter the grooves swaged into one, or both sides of each recess, according to whether strip 6 or 20 is used, and the grooves will guide the strips to their positions for the cam pins (FIG. 6) or the screws and cam pins (FIG. 8).

In a clamping pin that is three-sixteenths inch in diameter, it has been found that with the flat surface 10 only 1/32 inch offset toward the axis of the pin is adequate and satisfactory.

With respect to the dimensions hereinbefore given, these are not to be considered limitations, inasmuch as they may vary according to the places where the joints are to be used, and the thickness and width of the frame members.

We claim:

1. A miter lock device for clamping and locking together the end of one wooden member with the end of another wooden member, which ends have flat, parallel surfaces engageable for forming a miter joint:
   a. an elongated strip of rigid material formed with an opening in each end;
   b. one opening in one end of said strip having a straight cam engaging edge extending at a right angle to the length of said strip at the side of said opening nearest the end of the strip nearest thereto;
   c. an elongated anchoring element adapted to extend through the outer opening in the other end of said strip and to project from opposite sides of said strip into one member of said pair;
   d. an elongated cam element of uniform cross-sectional contour from end to end transversely of its length adapted to rotatably extend through said one opening and projecting from opposite sides of said strip for extending into the other member of said pair for supporting said cam element in said other member for rotation relative to said strip;
   e. said cam engaging edge of said one opening being straight and said cam element having a flat side adjacent and facing said straight edge and a cylindrical cam surface extending around said cam element from said flat side engageable with said cam engaging edge upon rotation of said cam element when said cam element extends through said one opening with its ends rotatably supported in said other member for applying a force to said strip in a direction away from said anchoring element to clamp and lock such joint together when said surfaces on said members are substantially together and said other end of said strip is anchored in said one member of said pair.

2. In a device as defined in claim 1:
   f. a pair of parallel ridges formed on said strip along its opposite longitudinally extending edges projecting to one side of said strip.

3. In a device as defined in claim 1:
   f. said anchoring element being of the same structure as the cam element defined in claim 1, also having a cam surface; and
   g. said other opening having the same shape as said one opening defined in claim 1 including the straight cam engaging edge adapted to be engaged by said cam surface upon rotating said element relative to said strip.

4. A miter joint comprising:
   a. a pair of wooden members having planar meeting surfaces for forming said miter joint;
   b. a recess formed in each member opening outwardly of said surfaces with their open outer ends in registration when said surfaces are in engaging relation;
   c. a straight, elongated strip of rigid material extending into said recesses and across said surfaces at a right angle to the planes of the latter;
   d. anchor means for anchoring one end of said strip within the recess in one of said members;
   e. cam means including an element rotatably supported within the other member of said pair having a cam thereon and a cam engaging portion integral with the end of said strip within the recess in said other member of said pair in a position for engagement with said cam upon rotation of said element for moving said meeting surfaces into tight engagement with each other and for locking them together;
   f. said strip being wholly enclosed within said members and said element being within said other member and accessible at one side of the latter for so rotating it;
   g. said strip being formed with an opening in said one end thereof and in the other end positioned in recesses and spaced a substantial distance from said meeting surfaces;
   h. said anchor means comprising an elongated element extending through the opening in said one end of one strip of said pair and projecting into said one member at opposite sides of said strip;
   i. the opening in the other end of said strip having a straight cam engaging surface in the plane of said strip, and said element comprising an elongated element extending from one side of said other member through said last mentioned opening having a flattened surface facing and closely adjacent said cam engaging surface and a convex surface extending from one side of said flattened surface to the other providing said cam and the cam surface to effect clamping and locking said members together when said element is rotated to a position with said convex surface in engagement with said cam engaging surface.

5. In a miter joint as defined in claim 4:
   j. said anchor means corresponding in structure to said cam means, whereby said clamping and locking said joint may be effected by actuation of cam means at either or both of said members.

6. In a miter joint as defined in claim 4:
   j. said anchor means being a screw.

7. A miter joint comprising:
   a. a pair of wooden members having planar meeting surfaces for forming said miter joint;
   b. a recess formed in each member opening outwardly of said surfaces with their open outer ends in registration when said surfaces are in engaging relation;
   c. a straight, elongated strip of rigid material extending into said recesses and across said surfaces at a right angle to the planes of the latter;
   d. anchor means for anchoring one end of said strip within the recess in one of said members;
   e. cam means including an element rotatably supported within the other member of said pair having a cam thereon and a cam engaging portion integral with the end of said strip within the recess in said other member of said pair in a position for engagement with said cam upon rotation of said element for moving said meeting surfaces into tight engagement with each other and for locking them together;

f. said strip being wholly enclosed within said members and said element being within said other member and accessible at one side of the latter for so rotating it;

g. said strip having two opposite flat sides, and said recesses each having two opposite flat sides in tight engagement with said strip;

h. a pair of parallel ridges on said strip along its longitudinally extending edges projecting into one of said flat sides of said recesses and parallel grooves formed in said one of said flat sides for receiving said ridges and for guiding said strip endwise into said recesses, and for reinforcing said strip against distortion.

* * * * *